(No Model.)
G. M. PETERS.
PERCH HEEL FOR VEHICLES.
No. 268,123. Patented Nov. 28, 1882.
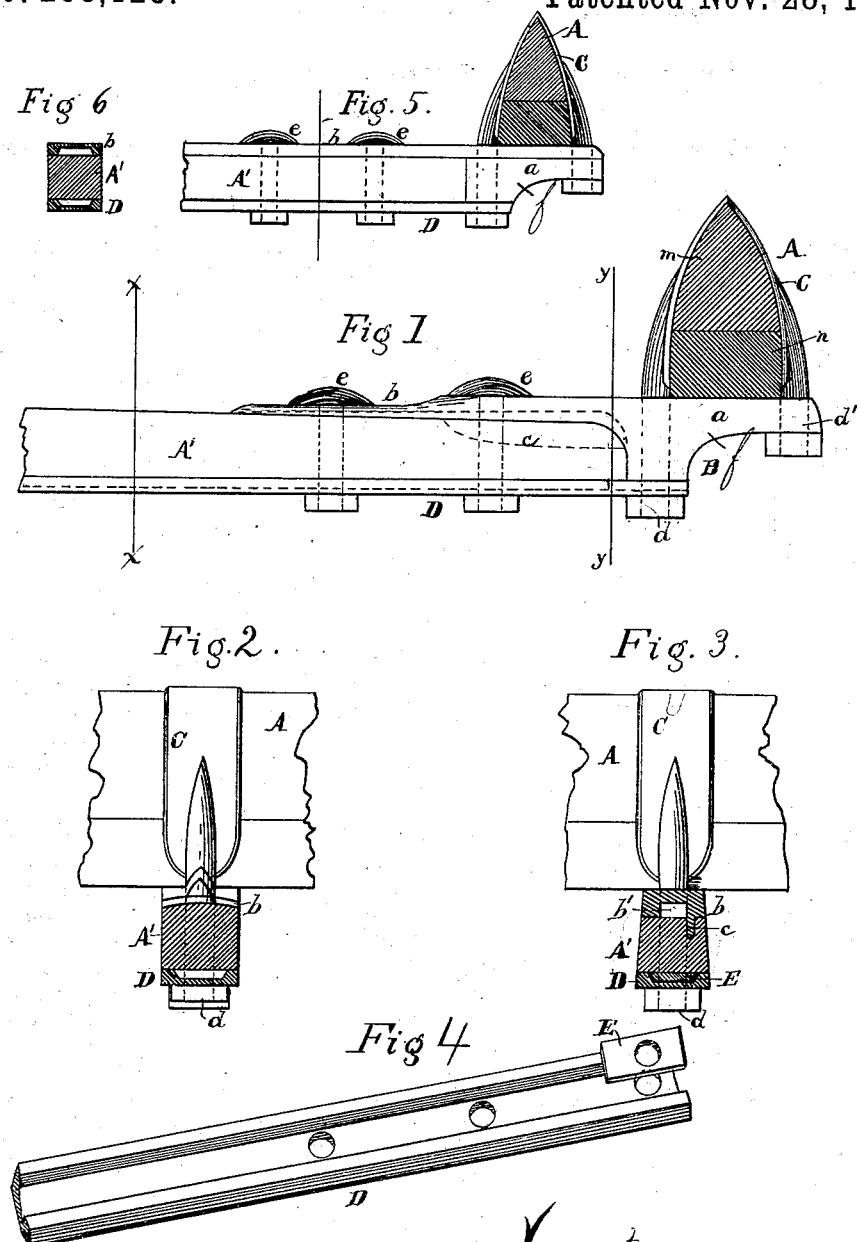
Attest:
E. R. Hill
Wm. R. Fee
Inventor:
George M. Peters
per Wm. Hubbell Fisher,
Atty

UNITED STATES PATENT OFFICE.

GEORGE M. PETERS, OF COLUMBUS, OHIO.

PERCH-HEEL FOR VEHICLES.

SPECIFICATION forming part of Letters Patent No. 268,123, dated November 28, 1882.

Application filed February 11, 1881. (No model.)

*To all whom it may concern:*

Be it known that I, GEORGE M. PETERS, of Columbus, Franklin county, Ohio, have invented certain new and useful Improvements in Perch-Heels, of which the following is a specification.

The object of my invention is to provide a perch-heel for attaching the ends of the perches to the axles or bolsters of buggies, which will be strong, durable, and in every way efficient, and can be easily and cheaply manufactured.

It relates more especially to running-gear, in which it is desirable to drop the perch slightly below the axle, as is the case when "piano-box" bodies are used, it being desirable to hang this class of bodies as low as possible.

Ordinarily the perch-heel employed requires to be welded to the perch-plate before the latter is secured to the perch, and this necessitates more work for the blacksmith, and is therefore expensive for the manufacturer.

My invention does away with the necessity of welding the perch-heel to the perch-plate, and yet makes a very strong connection between the perch and axle or bolster.

The various features of my invention and the advantages resulting therefrom will become apparent from the following description.

Referring to the drawings, Figure 1 is a side elevation of one end of a perch, which is attached by the use of my improved perch-heel to the axle, shown in section. Fig. 2 represents a transverse section through Fig. 1 taken at the line $x\ x$, and Fig. 3 a transverse section taken at the line $y\ y$. Fig. 4 is a perspective view of one end of a perch-plate of my invention, and which is the preferable form of plate to be used in connection with my improved perch-heel. Figs. 5 and 6 represent a modification of my invention.

A represents the axle, of any suitable shape and material, (here shown, composed of wood $m$ and iron $n$.)

A' represents the perch, which is secured to the axle by the perch-heel B. This perch-heel consists of a body, $a$, preferably of the form shown, and the extension or leaf $b$, which latter is made to extend to the desired point on the top of the perch. This extension $b$ is preferably channeled on its under side, as at $b'$, Fig 3, also represented by dotted lines in Fig. 1, to make it lighter and cheaper to manufacture, and is strengthened by a downwardly-projecting ridge, $c$, which fits into a recess in the upper side of the perch, as shown. This ridge assists to prevent any lateral displacement of the perch. When desired, the ridge $c$ may be located in the vertical plane of the longitudinal center of the extension $b$ instead of being, as herein shown, at one side. The body $a$ of the perch-heel extends under the axle, as shown in Fig. 1, and is secured thereto by a clip, C. The extension $b$ is provided with holes, through which pass bolts $e$, which secure the perch to the perch-heel.

On the under side of the perch is the perch-plate D, the end of which extends out past the end of the perch and under the body $a$ of the perch-heel, so that the bolt $d$, attached to one of the branches of the clip C, after passing through the body $a$ of the perch-heel, passes through this end of the perch-plate, and a nut is screwed onto this branch or bolt $d$. The other branch, $d'$, of the clip C passes through the outer end of the body of the perch-heel, as shown, and a nut is screwed onto the end of this branch $d'$. The perch-plate and axle are thus secured together. This perch-plate is preferably channeled on its upper side, as shown, by which construction I am enabled to use a steel plate, and yet be able to punch the required holes in the plate through which to pass the bolts which secure the plate to the perch, which holes could not be punched through the plate were it made of a uniform thickness throughout unless very thin. It will thus be seen that by using the form of plate here shown it may be made much lighter, and, being made of steel, much stronger than if made of iron of an even thickness throughout. When this channeled perch-plate is used it will be found desirable to use a washer, E, which fits in the channel, and through which the bolt $d$ passes. This washer is just sufficiently wide and thick to fill the channel in the perch-plate around the bolt, so that the nut which is screwed onto the bolt $d$ will have a solid bearing when it is tightened. This washer E may be a separate piece, as shown, or its equivalent may be formed on the under side of the perch-heel in the shape of a lug, which will fit into the channel in the upper side of the perch-plate.

If desired, washers like the one E may be placed in the channel in the perch-plate at the point through which the bolts e pass.

It will be seen that by the use of my invention, as above described, the end of the perch will be clamped between two metal plates, and that these plates will be very firmly secured to the axle.

A modification of my invention is represented by Fig. 5, in which modification the extension b is made in a separate piece from the body a, and the piece b extends between the body a and the axle, as shown, and is secured in this position by the clip C, which secures the body of the perch-heel to the axle. In this case this upper extension or plate may be made of the same material and form as the perch-plate D.

Having thus described my invention, what I claim as new, and desire to secure by Letters Patent, is as follows:

1. A perch-heel consisting of the body a, provided with the extension b, overlying the perch, the body a at the end next the perch being extended down across the end of the perch and at the opposite end being cut away beneath and terminating in the narrow extension or portion f, all formed in one piece, substantially as and for the purposes specified.

2. A perch-heel consisting of the body a, provided with the extension b, overlying the perch, and provided with the central ridge or flange, c, the body a being at the end next the perch extended down across the end of the perch and at the opposite end being cut away and terminating in the narrow extension or portion f, all formed in one piece, substantially as and for the purposes specified.

3. In combination, the perch-heel consisting of the body a, provided with the extension b, overlying the perch, the body a being at the end next the perch extended down across the end of the perch and at the opposite end cut away and terminating in the thin narrow portion or branch f, formed in one piece, and the perch-plate extending beneath the extension of body a and the perch A', and the axle, and clip C, whose branch d' passes through the extension f and branch d, through the downwardly-extended portion of body a, substantially as and for the purposes specified.

4. The combination of extension b, overlying the perch and the body a, the end of which next the perch extends down across the end of the perch and the thin extension or branch f, and the perch-plate extending under the downwardly-extending portion of the body a and the clip C, the short branch d' of which passes through the extension f and the long branch d through the deep portion of body a and through the perch-plate, substantially as and for the purposes specified.

5. The combination of extension b, overlying the perch and provided with the central ridge or flange, c, and the body a, the end of which next the perch extends down across the end of the perch and the thin extension or branch f, and the perch-plate extending under the downwardly-extending portion of the body a and the clip C, the short branch d' of which passes through the extension f and the long branch d through the deep portion of body a and through the perch-plate, substantially as and for the purposes specified.

6. The combination of the channeled perch-plate and the perch heel or body a, extended down across the end of the perch and provided at bottom with the lug or washer E, fitting into the channeled perch-plate, substantially as and for the purposes specified.

7. A perch-heel provided with channeled extension b, the ridges of said channel being adapted to rest on the top of the perch, substantially as and for the purposes specified.

8. A perch-heel provided with channeled extension b, the ridges of said channel being adapted to rest on the top of the perch, said extension being further provided with the ridge or flange c, adapted to enter a slot in the wood of the perch, substantially as and for the purposes specified.

9. A perch-heel provided with the extension b, adapted to rest upon the top of the perch and provided with a flange or ridge, c, adapted to enter a slot or depression in the top of the perch, substantially as and for the purposes specified.

GEORGE M. PETERS.

Attest:
 Mrs. GEO. M. PETERS,
 ESSIE M. PETERS.